United States Patent [19]
Grigsby, Jr. et al.

[11] Patent Number: 5,435,709
[45] Date of Patent: Jul. 25, 1995

[54] APPARATUS FOR PREPARING CHEMICAL COMPOUNDS TO BE MIXED FOR REACTION

[75] Inventors: Charles O. Grigsby, Jr., Hamilton, Ill.; John A. Abrams, Chesterfield, Mo.

[73] Assignee: Gemini Braids, Inc., St. Louis, Mo.

[21] Appl. No.: 88,124

[22] Filed: Jul. 7, 1993

[51] Int. Cl.$^6$ ............... B29C 53/14; B29C 47/04; B29C 33/56
[52] U.S. Cl. ............... 425/103; 264/130; 264/171; 264/177.17; 264/295; 425/104; 425/131.1; 425/319; 425/321; 425/372; 425/391; 427/177
[58] Field of Search ............... 425/103, 104, 131.1, 425/391, 371, 372, 319, 320, 321, 334; 264/103, 295, 129, 130, 171, 177.17, 210.1, 211.12; 427/177, 421

[56] References Cited

U.S. PATENT DOCUMENTS

| | | | |
|---|---|---|---|
| Re. 30,843 | 1/1982 | Flint | 428/48 |
| 2,573,050 | 10/1951 | Orsini | 425/319 |
| 2,704,982 | 3/1955 | Rhodes | 425/372 |
| 2,779,970 | 2/1957 | Stocker | 425/319 |
| 2,862,616 | 12/1953 | Capozzi et al. | 206/147 |
| 2,867,179 | 1/1959 | Eyster | 425/391 |
| 3,164,947 | 1/1965 | Gaston | 264/177.17 |
| 3,359,128 | 12/1967 | Humphrey et al. | 427/177 |
| 3,550,194 | 12/1970 | Frohlich | 425/391 |
| 3,585,943 | 6/1971 | Tauguy et al. | 425/391 |
| 3,708,379 | 1/1972 | Flint | 428/58 |
| 3,993,422 | 11/1976 | Riviere et al. | 425/391 |
| 4,074,958 | 2/1978 | Molenaar | 425/319 |
| 4,116,742 | 9/1978 | Firth | 156/289 |
| 4,435,144 | 3/1984 | Kemper | 425/371 |
| 4,767,638 | 8/1988 | Uhrovic | 425/321 |

FOREIGN PATENT DOCUMENTS 1278251 6/1972 United Kingdom ............... 425/319

*Primary Examiner*—Jay H. Woo
*Assistant Examiner*—Duane S. Smith
*Attorney, Agent, or Firm*—Robert A. Brown

[57] ABSTRACT

Apparatus for preparing first and second chemical compounds to be mixed for reaction, the first and second chemical compounds being extruded in respective first and second bands of semi-solid material and wherein one of the bands may be coated with a protective coating to prevent a chemical reaction between the epoxy resin and the curing agent until the epoxy resin and curing agent are kneaded together, the apparatus including a twisting section including a pair of endless belts which have portions overlying one another, the belts being oriented so that their axes extend at complementary angles relative to the direction of travel of an infeed conveyor belt which advances the juxtaposed bands of material through the twisting section which twists together the bands, producing an elongated, generally cylindrical product with first and second bands being wrapped helically upon one another. The first and second bands of material can be prepared in predetermined lengths and individually on the infeed conveyor belt or can be extruded continuously onto the infeed conveyor belt, twisted together and cut to size at the output of the twisting section.

11 Claims, 4 Drawing Sheets

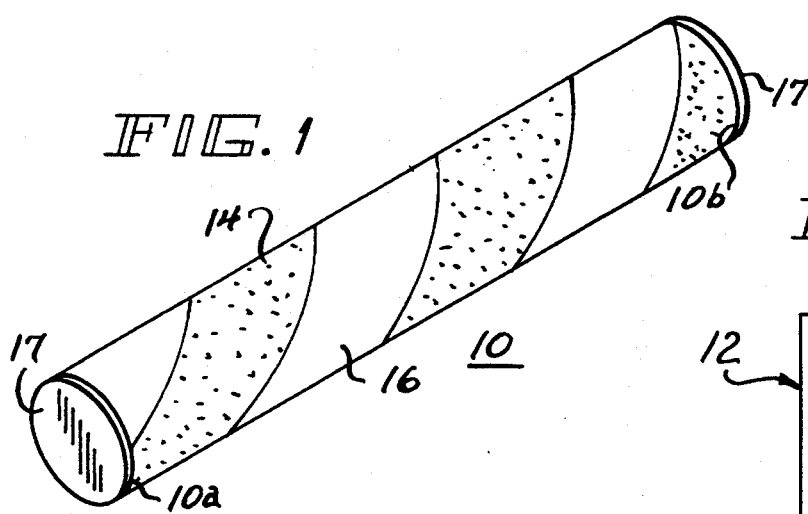
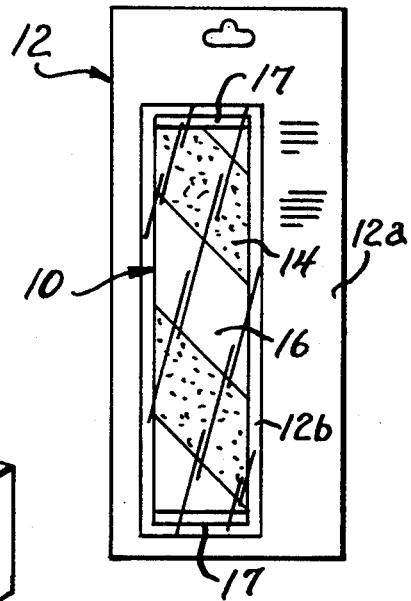
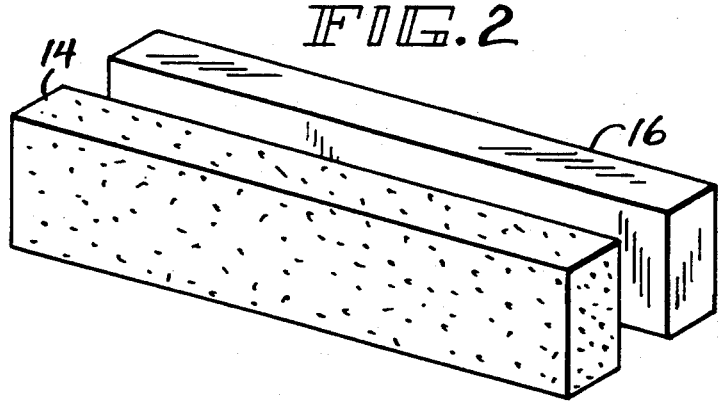
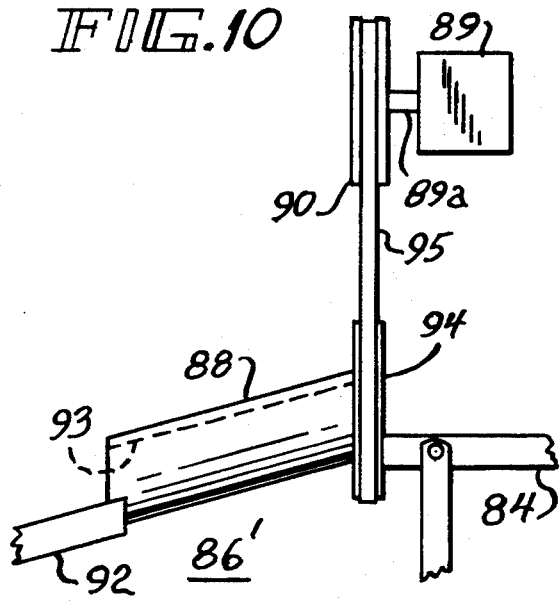
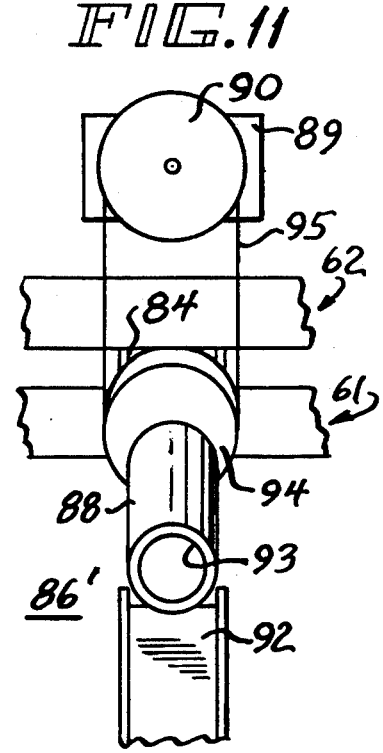

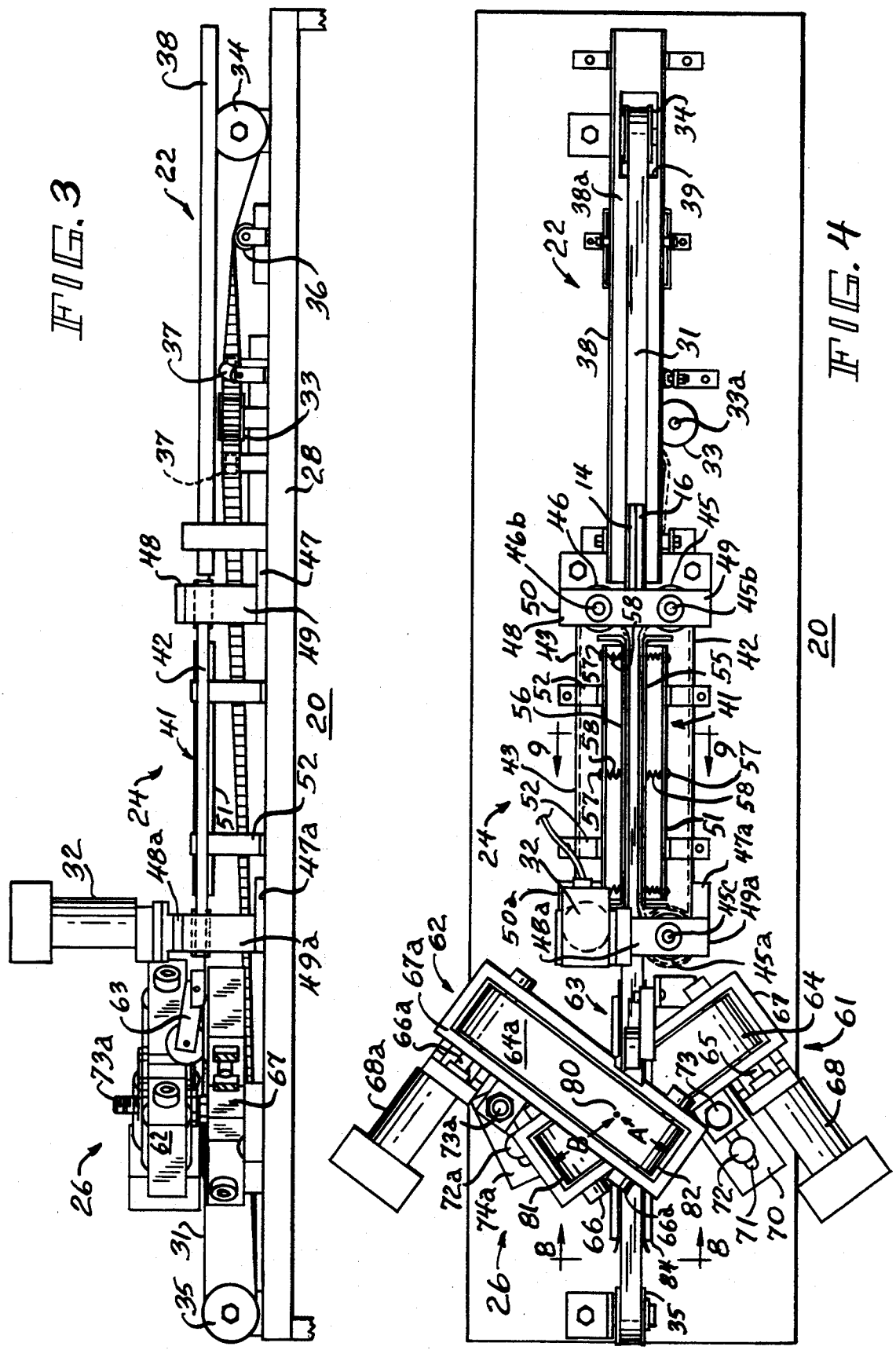

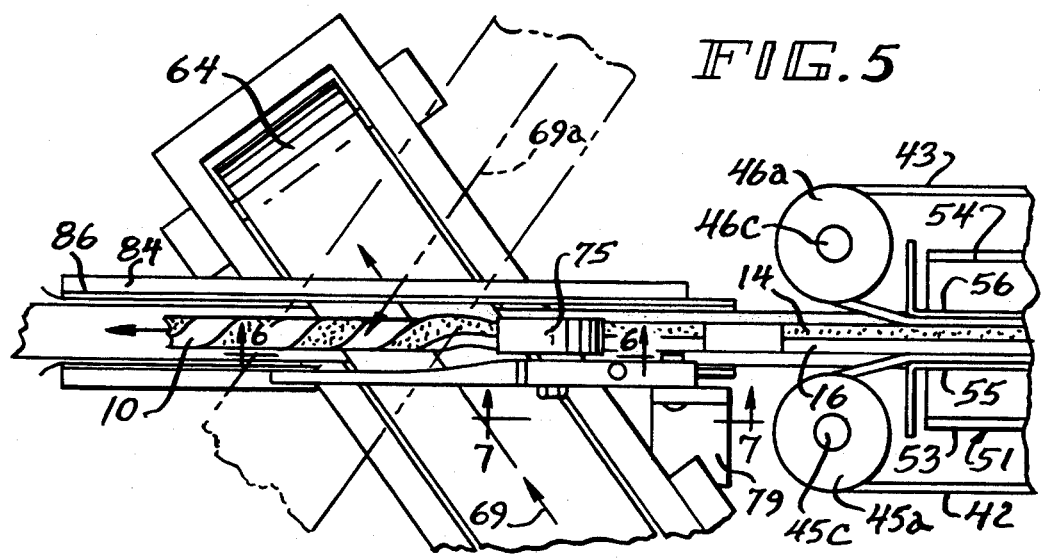
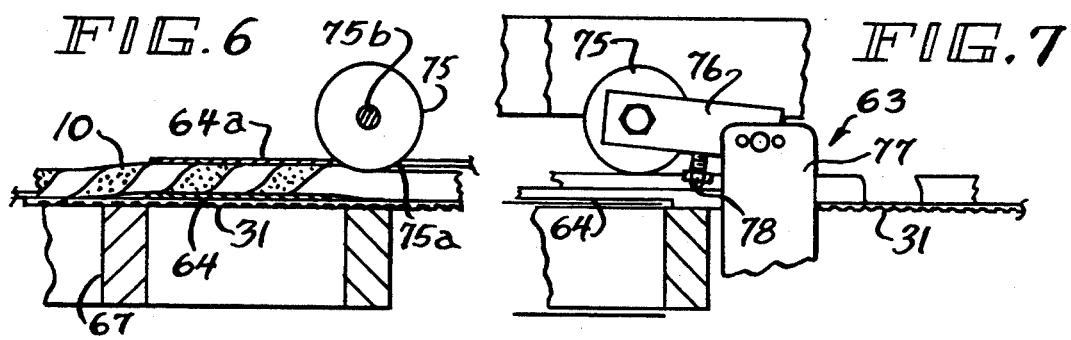
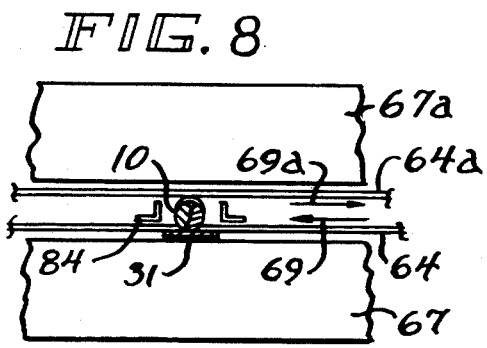
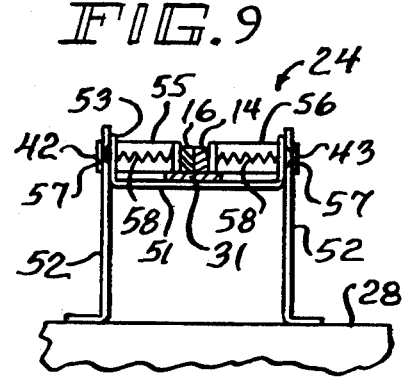

APPARATUS FOR PREPARING CHEMICAL COMPOUNDS TO BE MIXED FOR REACTION

BACKGROUND OF THE INVENTION

This invention relates to chemical compounds, such as epoxy resin adhesives, which include an epoxy resin and a curing agent, and more particularly, to a method and apparatus for preparing such chemical compounds to be mixed for reaction.

Epoxies are furnished in two parts, an uncured resin containing a chemical compound of the epoxide group and a catalyst consisting of an amine or other compound that acts as a curing agent. Curing is effected by mixing the curing agent with the epoxy resin just prior to use and hardening is rapid. The epoxy resin and the curing agent are packaged separately to prevent premature curing.

In the two-part mixing process, an exacting amount of the epoxy resin and the curing agent must be measured prior to mixing of the two parts together. Typically, the measured amounts of epoxy resin and curing agent are blended in a container for mixing and the ultimate reaction process necessary. The requirement for exact measured portions of the epoxy resin and the curing agent gives rise to potential inconsistencies and error. Also, the drying potential of each part of the two-part epoxy resin and curing agent product can render the ultimate mixing process inoperative because of the drying of one part causing poor results in mixing the two parts together. Moreover, improper mixing may bring about poor results and over-mixing one part over another can result in waste. Also, these mixing processes can be messy, particularly when the epoxy resin and curing agent are in liquid form.

In one known process for preparing an epoxy mixture, the epoxy resin and the curing agent are introduced into two different syringe-like containers and forced out of the containers by depressing a plunger causing both parts to be extruded in liquid form through a common outlet, thus mixing both elements of the epoxy. Although this arrangement provides controlled mixing of the two elements of the epoxy mixture, the epoxy is extruded in liquid form and as such is not end-user oriented. Also, the product may have limited shelf life.

Another process for preparing an epoxy mixture is disclosed in Re. U.S. Pat. No. 30,843. In this disclosed process, an epoxy resin and a curing agent are extruded in side-by-side relationship forming a tape. After extrusion, the tape which is formed is rolled into any convenient length and packaged. The epoxy tape is formulated so that the epoxy resin and the curing agent are contained in separate bands making up the tape in such a manner that the epoxy resin itself will not cure until substantially equal lengths of the respective bands are combined into a substantially uniform mixture.

SUMMARY OF THE INVENTION

It is an object of the invention to provide a method and apparatus for preparing chemical compounds to be mixed together for reaction.

Another object of the invention is to provide a method for preparing a two-part epoxy resin and curing agent product having predetermined proportions of the epoxy resin and curing agent and which is dispensable without mess or waste.

A further object of the invention is to provide a method for preparing a packaged, pre-proportioned two-part epoxy resin and curing agent which is characterized by an extended shelf life for the product.

Another object of the invention is to provide a method for producing chemical compounds to be mixed together for reaction which are in semi-solid form and adapted to be kneaded by the end-user for curing the epoxy resin.

A further object of the invention is to provide a method for preparing chemical compounds, including an epoxy resin and a curing agent, wherein the two compounds are twisted together and yet not inter-reacted.

Yet another object of the invention is to provide an apparatus for twisting together a strip containing uncured epoxy resin material and a strip containing a curing agent to produce an epoxy repair material which may be readily activated by an end-user.

The present invention provides a method of preparing first and second chemical compounds to be mixed for reaction. The method includes preparing a first elongated band containing the first chemical compound, preparing a second elongated band containing the second chemical compound, and, preferably, applying a protective coating to at least one of the bands. Then, the first and second bands are positioned in side-by-side relationship and the juxtaposed bands are twisted together to produce an elongated, generally cylindrical product with said first and second bands being wrapped helically upon one another.

In accordance with another aspect of the invention, there is provided apparatus for preparing an epoxy resin and a curing agent to be mixed for reaction wherein the epoxy resin is formed into a first elongated band and the curing agent is formed into a second elongated band. Preferably, at least one of the bands includes a protective coating to prevent premature curing of the epoxy resin. The first and second bands being arranged in side-by-side relationship. The apparatus comprises twisting means and input means for moving the juxtaposed bands through the twisting means whereby the twisting means twists the juxtaposed bands together to produce an elongated, generally cylindrical product with the first and second bands being wrapped helically upon one another.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a perspective view of the epoxy repair material produced using the method and apparatus of the present invention;

FIG. 1A is a plan view of a blister pack containing the epoxy repair material;

FIG. 2 illustrates the two constituent elements of the epoxy repair material illustrated in FIG. 1;

FIG. 3 is a side elevation view of forming apparatus for forming the epoxy repair material illustrated in FIG. 1;

FIG. 4 is a top plan view of the forming apparatus illustrated in FIG. 3;

FIG. 5 is an enlarged fragmentary view illustrating the twisting section of the apparatus illustrated in FIG. 4;

FIG. 6 is a fragmentary side view of hold down apparatus of the twisting section;

FIG. 7 is a fragmentary side view of the epoxy repair material being discharged from the twisting section of the apparatus;

FIG. 8 is a view taken in the direction of arrow 8—8 of FIG. 4;

FIG. 9 is a sectional view taken along the lines 9—9 of FIG. 4;

FIG. 10 is a side elevational view of an output stage of the apparatus;

FIG. 11 is an end view of the output stage of the apparatus illustrated in FIG. 10.

DESCRIPTION OF A PREFERRED EMBODIMENT

Figure 12:
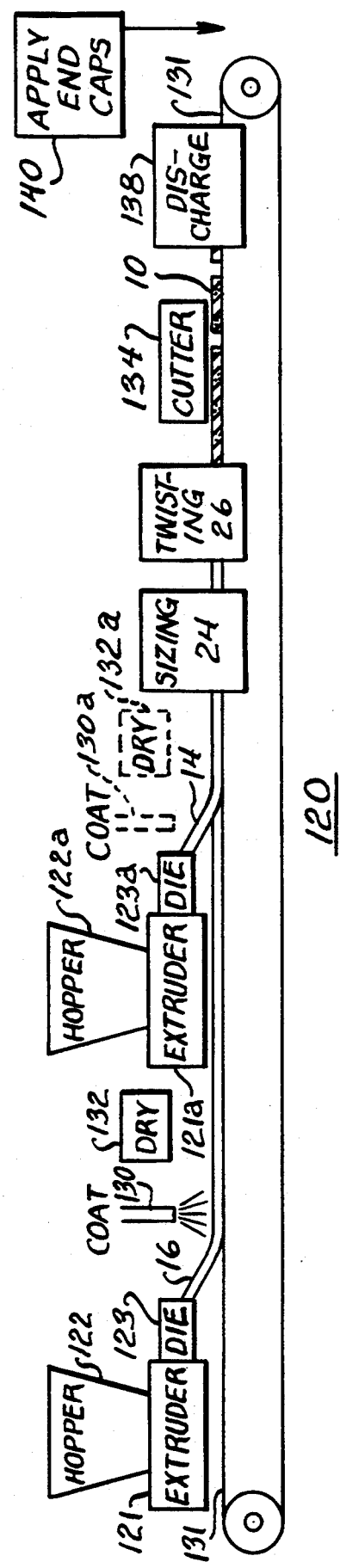
FIG. 12 is a simplified block diagram illustrating apparatus for preparing the epoxy repair material in a continuous automatic mode.

Referring to the drawings, FIG. 1 is a perspective view of an epoxy repair material 10 which is produced by the method and apparatus provided by the present invention. The epoxy repair material can be used as an adhesive to join elements together or used as a surface coating, a filler, a laminating adhesive, etc. The epoxy repair material 10 is formed of two bands or strips 14 and 16 which are twisted together to form a generally cylindrical product which is approximately seven inches long. One of the bands 14 contains an epoxy resin material in semisolid form. The other band 16 contains material also in semisolid form which consists of an amine or other compound that acts as a curing agent. Plastic, self-adhering end caps 17 enclose the ends 10a and 10b of the epoxy repair material 10. Preferably, the bands 14 and 16 are of different contrasting colors. This indicates to the user that the epoxy material is uncured and presents an attractive product. Referring to FIG. 1A, if desired, the epoxy repair material 10 may be displayed within a blister pack 12 including a blister card 12a and a blister 12b, as is readily available in the art.

The material is self-curing at room temperature. One or both of the bands, is preferably, coated with a protective coating or film which maintains the two compounds in a pre-mixed condition, chemically independent, preventing a premature reaction between the epoxy resin and the curing agent until the material is to be used. However, it is within the scope of the present invention that one or both of the bands do not contain or require a protective coating. This is particularly true when the shelf life of the epoxy repair material 10 is of a short duration of time. In such an instance, one or more of the repair material bands may be sprayed with a fine mist of moisture or the bands may be substantially free of any protective coating or films.

Other substances suitable for providing a protective coating may be of polyvinyl acetate, miscible solvent alcohol and a corn starch powder compound, similar to but not limited to talc. The resultant protective coating is slightly tacky and serves to maintain the two bands 14 and 16 in juxtaposed relation when they are placed together. The protective coating permits the two bands 14 and 16 to be twisted together and to be packaged in a common compartment, such as in a blister pack, facilitating use of the material. The twisting together of the two elements which make up the epoxy repair material maintains the two elements wrapped together in an operative relationship for future curing even after the product has been handled for cutting of a portion of the material for use. That is, the two twisted together bands 14 and 16 will not separate from one another, making easy the subsequent cutting off of further lengths of the material while maintaining the desired pre-mix ratio of the two elements.

When the material is to be used, the user cuts off the portion of the material that is needed and the material that is cut off from the supply of material is then kneaded by hand for a short period of time, on the order of three minutes, which causes the curing agent to react with the epoxy resin, in the manner known in the art, curing the epoxy resin. The contrasting colors of the two bands 14 and 16 indicate to the user when the epoxy repair material has been kneaded sufficiently to provide the necessary curing because the mixture will become a uniform color.

As will be shown, the epoxy repair material 10 is formed by twisting together the band of epoxy resin 14 and the band of curing agent 16 using the forming apparatus 20 illustrated in FIGS. 3 and 4 which is provided by the present invention. The epoxy repair material 10 produced by the apparatus 20 has an appearance much like a barber pole consisting of two colors including approximately two turns of one band, and one complete turn and two half turns of the other band. To prepare the bands 14 and 16, the components of each band are prepared separately, mixing together the constituent elements. The material in semisolid form is extruded through a die to form slugs or bands. One or both of the slugs or bands may be coated with a protective coating prior to introduction to the forming apparatus 10. The protective material is applied in liquid form by dipping, spraying, brushing, or otherwise coating the band. The protective coating is air-dried, or dried by hot air.

Preferably, the material is provided in strip or band form having a rectangular cross section as shown in FIG. 2. By way of example, each slug or band is approximately 5¼ inches long, ¼ inch thick and ½ inch wide, and weighs approximately 28 grams. However, the cross section of the bands 14 and 16 may be circular, oval, square or other shapes and may have lengths, widths and thicknesses other than those for the exemplary embodiment. Also, the weight of the bands will vary as a function of the composition of the epoxy resin and the curing agent. Also, the curing agent may comprise more than one band.

The two bands 14 and 16 are positioned in side-by-side relationship, and the juxtaposed bands are introduced into the forming apparatus 20 shown in FIGS. 3 and 4 which shapes the bands and twists the two bands 14 and 16 together to form the end product 10 illustrated in FIG. 1. The apparatus 20 processes pre-cut lengths of the bands of material to produce the end product 10. Although the bands used are 5¼ inches long, the resultant end product 10 is approximately seven inches long because of shaping and twisting operations provided by the apparatus 20.

Referring now to FIGS. 3 and 4, the apparatus 20 includes an infeed conveyor section 22, a sizing chamber 24, and a twisting section 26 all of which are mounted on a support frame 28 which extends the length of the apparatus 20. The infeed conveyor section 22 includes an endless conveyor belt 31, a belt drive system including a belt drive motor 32, a belt drive sprocket wheel 33, a belt sprocket wheel 34, a belt sprocket wheel 35, directional guide rollers 36, tension rollers 37, and a channel member 38 which extends the length of the infeed conveyor section 22. By way of example, the channel member may be approximately twenty-four inches long and two inches wide. The infeed conveyor belt 31 may be one inch wide.

The endless belt 31 is a ribbed belt which extends around the sprocket wheels 34 and 35 and is maintained in engagement with the drive wheel 33 by the tension rollers 37. The lower reach of the conveyor belt 31 is turned 90° along its return path to allow vertical orientation of the drive shaft 33a of the drive wheel 33 to facilitate coupling of the drive wheel 33 to the drive motor 32. The channel member 38 has an aperture 39 in which is located the upper portion of the sprocket wheel 34 to locate the upper reach of the conveyor belt 31 slightly above the upper surface 38a of the channel member 38.

Referring to FIGS. 3–5 and 9, the sizing chamber 24 includes a trough assembly 41, a pair of ribbed belts 42 and 43, which extend around respective pairs of sprocket wheels 45, 45a and 46, 46a. Sprocket wheels 45 and 46 have respective shafts 45b and 46b journalled in a base 47 and a cross member 48 which extends in parallel overlying relation with base 47 and is spaced vertically from the base by vertical members 49 and 50. Similarly, sprocket wheels 45a and 46a have respective shafts 45c and 46c journalled in a base 47a and a cross member 48a which is spaced vertically from the base 47a by vertical members 49a and 50a. Sprocket wheel 46a has its shaft journalled in base 47a and is connected to the drive shaft of the motor 32 and directly driven thereby to rotate ribbed belt 43 at the speed at which the infeed conveyor belt 31 is driven. Ribbed belt 42 rotates freely about associated sprocket wheels 45 and 45a and is moved by virtue of its engagement with the product being conveyed through the sizing chamber 24 by infeed conveyor belt 31 and by the belt 43.

The trough assembly 41 includes a U-shaped member 51, shown in FIG. 9, which is supported on the frame 28 by four L-shaped support members 52. The member 51 has upturned sides 53 and 54 to which respective pressure plates 55 and 56 are mounted by bolts 57 and coil springs 58 which extend around the shafts of the bolts 57. The springs 58 are compressed between sides 53 and 54 and respective pressure plates 55 and 56 and urge the pressure plates 55 and 56 inwardly toward one another and into engagement with the inner surfaces of the belts 42 and 43 which pass between the pressure plates. The pressure plates maintain a predetermined spacing between the belts, which defines the desired lateral thickness for the product being conveyed through the sizing chamber. By way of example, the sizing chamber may be approximately sixteen inches in length. The pressure plates may be five and one-half inches in height. A typical separation between the belts 42 and 43 is about ⅜ inches.

Referring to FIGS. 3–5 and 8, the twisting section 26 includes a lower twist belt assembly 61, an upper twist belt assembly 62 and a hold down wheel assembly 63.

The lower twist belt assembly 61 includes an endless belt 64 extending around a pair of rollers 65 and 66 which are journalled in a rectangular frame 67 which is mounted on the frame 28. One of the rollers 65 is driven by a motor 68 mounted to the frame 67. The motor 68 rotates the belt 64 so that its upper reach moves in the direction of the arrow 69 in FIGS. 5 and 8. The lower twist belt assembly 61 extends at an angle relative to the infeed conveyor belt 31. As shown in FIGS. 5 and 6, the upper reach of belt 64 passes over the infeed conveyor belt 31 so that the product 10 being formed is momentarily carried on the upper surface of the belt 64. That is, belt 64 is interposed between belt 64 and the product so as to directly contact the product being advanced through the twisting section 26 during use of the apparatus 20.

The frame 67 is adjustably mounted on the frame 28 by a slotted base member 70. The base member 70 is generally rectangular in shape and includes an elongated slot 71 extending perpendicular to the axis of the belt 64. A pivot member 72 and set bolt 73 are received in the slot 71 to secure the base member 70 to the frame pivot member 72. Removal of the bolt 73 permits axial and pivotal movement of the lower twist belt assembly 61 relative to frame 28 to adjust the orientation of twist bolt 64 relative to the axis of conveyor belt 31. In the exemplary embodiment, the lower twist belt assembly 61 is adjusted so that the axis of twist belt 64 extends at an angle of approximately 35° relative to the direction of movement of the infeed conveyor belt 31.

The upper twist belt assembly 62 is similar to the lower twist belt assembly 61 and includes an endless belt 64a which extends around rollers 65a and 66a journalled in rectangular frame 67a which is supported on the frame 28 but positioned in an overlying relationship with the lower twist belt assembly 61 by a support assembly 74. Belt 64a is driven by a motor 68a which is mounted to the frame 67a. Motor 68a rotates the belt 64a so that its lower reach moves in the direction of arrow 69a in FIGS. 5 and 8. The support assembly 74 has a base 70a which is adjustably mounted to the frame 28 and includes a slot 71a in which are received a pivot pin 72a and set bolt 73a for adjustably securing the member 70a to the frame 28 while permitting axial and rotational movement of the upper twist belt assembly 62 relative to the frame 28 for adjusting the position of the upper twist belt 64a relative to the lower twist belt assembly 61 and relative to the infeed conveyor belt 31. The set bolt 73a also permits vertical adjustment of the upper twist belt assembly 62 relative to the lower twist belt assembly 61 to change the separation between the belts 64 and 64a to accommodate bands 14 and 16 of different vertical widths. In the exemplary embodiment, the belt 64a of the upper twist belt assembly 62 is positioned to extend at an angle of −35° relative to the direction of travel of the infeed conveyor belt 31. The upper twist belt assembly 62 and/or the lower twist belt assembly 61 may include a liquid reservoir and a knife block element arranged to remove any residue of the epoxy resin material of curing material that may adhere to the belt during the twisting operation.

Referring additionally to FIGS. 6 and 7, the hold down assembly 63 includes a hold down wheel 75. Hold down wheel 75 is pivotally mounted on an arm 76 which in turn is cantilever mounted to the upper portion 77 of a vertical member 78, the base 79 of which is secured to the upper surface of the frame 28. The hold down wheel 75 is positioned so that its lower surface 75a engages the upper surface of juxtaposed bands 14 and 16 intermediate the output of the sizing chamber 24 and the inlet of the twisting section 26. The arm 76 is biased downwardly to preset the vertical spacing between the lower surface 75a of the hold down wheel 75 and the upper surface of the conveyor belt 31. An adjustment member 78, shown in FIG. 7, permits adjustment of the vertical spacing between the hold down wheel 75 and the upper surface of the conveyor belt 31.

Referring to FIGS. 4, 5 and 8, the twisted tubular-shaped epoxy repair material 10 produced by the apparatus 20 is conveyed from the twisting section 26 by the conveyor belt 31. Conveyor belt 31 rides in a guide member 84 including side walls 85, which defines the discharge outlet 86 of the apparatus 20. The end product 10 may be discharged into a suitable container (not shown) or removed manually from the apparatus 20 by the operator. The end caps 17 (FIG. 1) are applied to both ends of the product 10 after it has been discharge from apparatus 20.

Referring to FIGS. 4 and 5, twist belts 64 and 64a are oriented relative to the conveyor belt 31 such that a vertical axis through a point 80 on the axis of upper twist belt 64a intersects the axis of the lower twist belt 64 and the axis of the infeed conveyor belt 31. In one apparatus 20 which had twist belts having a length from end to end of fourteen inches, the dimension "A" taken from the non-driven end 81 of the belt 64 to the point at which the axis of the belt 64 intersects the axis of the conveyor belt 31, the vertical axis through point 80, and thus was four inches. The dimension "B" taken from the non-driven end 82 of belt 64a to point 80 was five inches. The length of the twisting section 26 may be approximately twenty-one inches with the length from the vertical axis through point 80 to the discharge outlet 86 of the apparatus 20 being about nine inches.

The belts 64 and 64a are driven by the motors 68 and 68a to rotate at different speeds. By way of example, the speed of the lower twist belt 64 which is the first twist belt to come into contact with the product may be 80% of the speed of belt 64a. The drive motors 68 and 68a have individual speed controls (not shown) to permit separate adjustment of the speed of the two motors. By virtue of the orientation of the twist belts 64 and 64a relative to the infeed conveyor belt 31, the relative speeds of the twist belts, and the location of the non-driven end of the belts 64 and 64a, respectively, the product advanced through the twisting section 26 is initially rotated in a counterclockwise motion by belt 64 of the lower twist belt assembly 61 and then rapidly whipped into a twisted helical configuration by the interaction of the two twist belts 64 and 64a. The hold down wheel 75 presses down on the top of the two bands 14 and 16, holding the bands on feed conveyor belt 31 and preventing the twisting action produced by the twist belt assemblies 61 and 62 from being transmitted rearwardly of the direction of movement of the product.

Referring to FIGS. 3 and 4, the operation of the forming apparatus 20 is apparent from the foregoing detailed description, and accordingly only a brief summary of the operation of the apparatus 20 along with mention of certain operating parameters and conditions is presented to demonstrate the operation of the apparatus. When power is applied to the forming apparatus 20, the belt drive motor 32 drives the infeed conveyor belt 31 and belt 42 of the sizing chamber 34. Also, belt drive motors 68 and 68a drive the twist belts 64 and 64a, with the upper twist belt 64a being driven at a faster speed than the lower twist belt 64. A slug, including a band of epoxy resin material 14 and a band of curing agent 16, both in semi-solid form, is placed on the infeed conveyor belt 31. The two juxtaposed bands 14 and 16 are carried by the conveyor belt 31 to the sizing chamber 24. Referring additionally to FIG. 9, the juxtaposed bands 14 and 16 are advanced to the inlet of the sizing chamber 24 defined by the spaced apart belts 42 and 43 and with continued movement of the infeed conveyor belt 31, the juxtaposed bands 14 and 16 are moved into engagement with the two belts 42 and 43 which supplement the action of the infeed conveyor belt 31 in moving the juxtaposed bands 14 and 16 through the sizing chamber 24 and in particular between the two pressure plates 55 and 56. The pressure plates 55 and 56 cause the bands to be compressed to the desired thickness which is defined by the spacing between the belts 42 and 43.

Referring to FIGS. 4–7, as the sized, juxtaposed bands 14 and 16 are discharged from the sizing chamber 24, the bands 14 and 16 are advanced by the infeed conveyor 31 toward the twisting section 26. At the inlet of the twisting section 26, the bands 14 and 16 are conveyed beneath the hold down wheel 75, the lower edge 75a of which engages the upper surface of the juxtaposed bands 14 and 16. The biased hold down wheel 75 applies a slight downward pressure on the juxtaposed bands 14 and 16, the wheel 75 rotating about its axis 75b so as to roll along the upper surface of the bands. With further advancement of the bands, the bands come into contact with the upper reach of the lower twist band 31 which rotates the juxtaposed bands 14 and 16 counterclockwise. With slight additional forward advancement of the bands, the upper surface of the bands comes into contact with the lower reach of the upper twist belt 64a which due to interaction of the two twist belts 64a and 64 causes the two bands to be rapidly whipped into a twisted helical configuration, providing the end product 10 shown in FIG. 5, for example.

Referring to FIGS. 4 and 8, the twisted cylindrically-shaped epoxy repair material produced by the forming apparatus 20 is conveyed from the twisting section 26 by the conveyor belt 31 and may be discharged into a suitable container or removed manually from the apparatus by the operator for application of end caps 17 to complete the production of the epoxy repair material 10 (FIG. 10).

Referring to FIGS. 10 and 11, there is illustrated a simplified representation of a discharge section 86' for the apparatus 20 which provides a tighter twisting together of the two bands 14 and 16 of material which form the epoxy repair material 10. The discharge section 86' includes a cylindrical member 88, a drive motor 89, a speed control pulley 90, and an output trough 92. The cylindrical member 88 may be a section of stainless steel pipe which is approximately five inches to seven inches in length with a through bore 93 having a diameter of about three-quarter inch to one inch.

The cylindrical member 88 is rotatably supported at the outlet of guide member 84 of apparatus 20, sloping downwardly, and with its through bore 93 aligned with the axis of the conveyor belt 31 such that the twisted epoxy repair material 10 being discharged from the twisting section 26 is introduced into the interior of the cylindrical member 88. The shaft 89a of the drive member 89 is coupled to the cylindrical member 88 by the speed control pulley 90 and a drive belt 93 which extends around the speed control pulley 90 and a radial flange 94 on the cylindrical member 88. Cylindrical member 88 is rotated at the same speed as the product being discharged from the twisting section 26. The drive motor 89 includes a speed control for adjusting the speed of rotation of cylindrical member 88.

Referring to FIG. 12, there is illustrated a simplified representation of apparatus 120 for continuously producing the epoxy repair product 10 in accordance with the present invention. The apparatus 120 includes an extruding apparatus 121 for continuously extruding the curing component 16 of the epoxy repair material onto an endless conveyor belt 131. The extruding apparatus 121 includes a hopper 122 which is charged with the curing material and a die 123 through which the material is extruded in the desired cross section. The continuous band of curing material 16 is conveyed by the conveyor belt 131 past a coating apparatus 130 which coats the band 16 of curing agent with a protective coating. The coated band of curing agent 16 is conveyed past a drying apparatus 132 which dries the protective coating. The continuous band of coated curing agent 16 is conveyed past a further extruding apparatus 121a which includes a hopper 122a which is charged with uncured epoxy resin. The uncured epoxy resin is extruded onto the continuous conveyor belt 131 through a die 123a and deposited in side-by-side relation with the coated band of curing agent 16. The two juxtaposed continuous strips or bands of material are conveyed through sizing chamber 24 described above and illustrated in FIGS. 3-4. The sized continuous bands are advanced to twisting section 26 described above and illustrated in FIGS. 3-6. The twisted together continuous bands of material are advanced to a cutting apparatus 134 which cuts the twisted together bands into predetermined lengths. The cut segments 10 are discharged from the apparatus 120 through a discharge chute 138 to a suitable mechanism 140 which applies the end caps to the segments of epoxy repair material produced.

It is pointed out that although the apparatus 120 illustrated in FIG. 12 applies a protective coating only to the curing agent, a protective coating may be applied to both components of the epoxy resin repair material, may be applied only to the epoxy resin being extruded by extruding apparatus 121a, or may be completely eliminated from covering the epoxy resin when the intended shelf life is of a short duration of time.

We claim:

1. Apparatus for preparing an epoxy resin and a curing agent to be mixed for reaction, the epoxy resin being formed into a first elongated band and the curing agent being formed into a second elongated band, at least one of said bands including a protective coating to prevent premature curing of the epoxy resin, the first and second bands being arranged in juxtaposed position, said apparatus comprising:

twisting means and input means for moving the juxtaposed bands through said twisting means whereby said twisting means twists the juxtaposed bands together to produce an elongated, generally cylindrical product with said first and second bands being wrapped helically upon one another, and wherein said twisting means includes first and second rotating belts, the axes of said first and second rotating belts extending at different adjustable acute angles relative to the direction of movement of the juxtaposed bands.

2. Apparatus according to claim 1 which includes means for applying a protective coating to one of the bands.

3. Apparatus according to claim 2 wherein said means for applying the protective coating includes spray means for spraying a solution of a protective coating on said one band of chemical compound and means for drying the protective coating.

4. Apparatus according to claim 3 wherein said spray means includes means for applying a protective coating to said first band and to said second band.

5. Apparatus according to claim 1 which includes hold down means for engaging the juxtaposed bands at the input of said twisting means.

6. Apparatus according to claim 1, which includes adjustment means for adjusting the height of the first rotating belt relative to the height of the second rotating belt.

7. Apparatus according to claim 1 wherein said twisting means includes hold down means for engaging the juxtaposed bands at the input of said first and second rotating belts.

8. Apparatus according to claim 1, wherein said first rotating belt extends at an angle of approximately 35° relative to the center line and said second rotating belt extends at an angle of approximately −35° relative to the center line.

9. Apparatus according to claim 1 including means for rotating said first and second rotating belts at different speeds.

10. Apparatus according to claim 1 wherein said input means includes means defining a sizing chamber for establishing at least the width of said juxtaposed bands and conveying means for conveying the juxtaposed bands through said sizing means and said twisting means.

11. Apparatus according to claim 9 including means for controlling the speed of said first rotating belt at approximately eighty percent of the speed of said second rotating belt.

* * * * *